United States Patent [19]

Mueller

[11] Patent Number: 4,964,988
[45] Date of Patent: Oct. 23, 1990

[54] HORIZONTAL BELT FILTER GUIDE

[75] Inventor: Max A. Mueller, Centerville, Utah

[73] Assignee: Baker Hughes, Incorporated, Houston, Tex.

[21] Appl. No.: 213,360

[22] Filed: Jun. 30, 1988

[51] Int. Cl.$^5$ .......................................... B01D 33/056
[52] U.S. Cl. .................................. 210/401; 210/406; 210/DIG. 3
[58] Field of Search ......... 210/400, 401, 406, DIG. 3; 474/123; 198/806, 807, 817, 840

[56] References Cited

U.S. PATENT DOCUMENTS

| | | | |
|---|---|---|---|
| 1,217,412 | 2/1917 | Chaplin | 198/806 |
| 2,963,161 | 12/1960 | Holland | 210/401 |
| 3,088,581 | 5/1963 | Rostal | 198/202 |
| 3,762,561 | 10/1973 | Davis | 210/401 |

Primary Examiner—W. Gary Jones
Assistant Examiner—Matthew O. Savage
Attorney, Agent, or Firm—Trask, Britt & Rossa

[57] ABSTRACT

A guide means for individually adjusting each of the carrier belts of a multi-belt horizontal belt filter is disclosed. The guide means includes a plurality of support rollers, each having a rotatable roller segment which is held in rolling contact with a respective carrier belt. The remaining structure of the support roller is held out of contact with the remaining carrier belts. Each support roller is made adjustable as to orientation and location whereby a selectively directed force may be applied to a given carrier belt to adjust its direction of travel.

13 Claims, 8 Drawing Sheets

HORIZONTAL BELT FILTER GUIDE

BACKGROUND OF THE INVENTION

1. Field:

The invention relates to conveyor belts and belt filters, especially those of the type designated generally as a horizontal belt filter. The invention is more particularly directed to a guide means suitable for guiding a belt in such filters.

2. State of the Art:

Devices employing an endless belt trained about a pair of rotating drums and used to convey objects from one location to another have been known for many years. A readily recognized example of such a device is the common conveyor belt. Filters in general, and belt filters in particular, have also long been known in the art.

Belt filters typically include a porous filter medium which is arranged over a moving carrier belt. The medium is oftentimes configured as an endless web thereby facilitating its being urged in a circuitous path by the carrier belt. The belt is also generally constructed in an endless configuration. The belt is typically trained over a pair of rotating drums.

In conventional filters, a given segment of the filter medium is held in contact with the carrier belt over the working run of the carrier belt. It is thereafter removed from the carrier belt, facilitating removal of caking formed on the medium surface. The medium is then readjusted on the carrier belt prior to the beginning of the subsequent working run.

A suction means is oftentimes associated with the medium/carrier belt assembly for purposes of expediting the filtering process. In one embodiment, the suction means is positioned beneath the carrier belt. The belt defines a plurality of apertures therein which communicate the suction means with the filter medium positioned atop the belt. A conventional suction means used in this environment includes a vacuum box having a spatially restricted inlet. Proper operation of the filter requires the belt apertures to be held in registration with the inlet slot of the vacuum box.

Understandably, the task of maintaining the apertures of a moving carrier belt in register with the vacuum inlet slot is difficult, given the dynamic relationship of a belt with its driving drum. Carrier belts, due to structural peculiarities resulting from manufacture and/or prolonged wear, are oftentimes prone to follow a less than desired path around a pair of parallel rotating drums. Furthermore, the drums themselves may contribute to the problem by being less than perfect in their design, manufacture and/or orientation. Absent a perfect matching of a carrier belt with a pair of rollers, belt filters generally require adjustment or guide means adapted for correcting the belt's travel over the drums. Various structural arrangements and devices have been suggested in the art.

In U.S. Pat. No. 3,762,561 (Davis), a guide structure having a pair of rotatable spools positioned to abut against the opposing sides of a carrier belt is disclosed. The spools serve to confine the belt to within a preselected spatial orientation and location in order to permit the routineer control over the carrier belt's path. In those belt filters having two or more coplanarly arranged belts, the use of the Davis guides requires that the belts be separated one from another to provide for the mounting of the guides. More particularly, the Davis structure places the guides on the non-working, return run of the carrier belt path. The belts are separated one from another and directed to a non-coplanar orientation whereby the guides may be positioned in abutment against the opposing edges of each carrier belt. The non-coplanar orientation disclosed requires one belt to be raised above the other to obtain free edges for the guides to act upon. The orientation avoids any lateral displacement of the belt which could conceivably introduce tension and stress into the belt.

Application of lateral forces to the outer edges of a carrier belt has been shown to cause buckling in the belt structure. Furthermore, long term outer edge force applications have been shown to lead to abrasion on the leading edge together with a loss of outer edge structural integrity. Understandably, an erosion or reduced structural integrity of the outer edges reduces if not eliminates the efficacy of guides positioned proximate those edges to control the carrier belt path.

It should be recognized that in multi-belt filter arrangements, it is desired to maintain the carrier belts in an edge-to-edge abutment over the working run portion of the belt path. This abutment relationship not only retards liquid drainage between the belts, but furthermore hinders the probability that the filter medium may be drawn into the cavity between the adjacent belts and thereby be pinched. This pinching oftentimes leads to the medium rupturing or otherwise failing.

Other guide arrangements have required carrier belts of modified construction. A conventional approach of this type is illustrated in FIGS. 1 and 2. As shown in cross-section, a carrier belt is modified to include a medially positioned elongate guide strip (A) that extends along the bottom surface of the carrier belt. Positioned on opposite sides of the strip is a pair of guides labeled (B) and (C). The guides may be a pair of cylindrically shaped rollers (C), each mounted for rotation about a vertical axis (D). The rollers (C) operate to exert a laterally directed force on the guide strip (A) thereby retaining the carrier belt in a preselected path. FIG. 2 illustrates an alternate guide structure wherein a bracket device (E) as opposed to a pair of rollers constitutes the guiding members.

Guide means of the types shown in FIGS. 1 and 2 have encountered problems in the past. The manufacture of carrier belts oftentimes requires that the guide strip (A) be laminated onto the otherwise planar belt structure. The imposition of lateral forces on the guide strip by the guide rollers creates a shear stress on the bonding of the guide strip with the planar portion of the carrier belt. In operation, the lateral force applications tend to result in the delamination of the guide strip from the carrier belt. Once the integrity of the guide strip is destroyed, the ability of the guide to regulate the path of the belt is compromised, if not destroyed.

In those embodiments of the type shown in FIG. 2 wherein the guides are not rotatably mounted, the stationary guides or shoes tend to abrade away the guide strip, eventually leading to a loss in the ability of the guides to control the carrier belt path.

In many filtering operations, the requisite processing time and spatial area are constants. It has been recognized in recent years that adjusting the carrier belt's structural configuration by widening the belt while simultaneously shortening the length of the run can lead to improved process efficiencies in that the prerequisite spatial processing area is provided with lower energy requirements. The shortened carrier belt devices typically require a slower moving belt. Due to the shorter belt configuration, the amount of drag which is resultant from the vacuum pan's action in the belt, and which must be overcome in order to operate the belt, is reduced. Both considerations lead to further energy savings.

Though widened carrier belt filters have been shown to possess processing efficiencies, a complication has arisen in the manufacture of carrier belts having widths in excess of two meters. Though belts having widths approaching 4.2 meters have been manufactured overseas, such manufacture requires specialized machinery which often makes the costs of manufacture prohibitive. The conventional approach has been to mount a plurality of belts in a side-by-side arrangement to achieve the desired width. Observably, this approach introduces the potentiality of complications in that any irregularity in the path of one carrier belt effects its adjacent neighboring belts. As the irregular pathed belt is displaced laterally, it applies a laterally directed force to the carrier belt positioned contiguous to it, thereby disrupting the path of the contiguous belt. Understandably, the multiplication of the number of belts enhances the possibilities and probabilities of increased interrelationships between the plurality of belts.

The trend toward multi-belt filters has created a need for adjustment means adapted for adjusting the paths of the various carrier belts so as to achieve optimal filter efficiency.

SUMMARY OF THE INVENTION

The invention discloses a guiding means for applying a corrective aligning force to an individual belt in a belt filter having multiple carrier belts. The guiding means includes at least one but preferably a plurality of supports. Each support is configured to be in contiguous rolling contact with a single carrier belt while avoiding contact with the remaining carrier belts. In one embodiment, each support roller extends laterally across the width of the entire assembly of carrier belts.

Each support includes a roller mounted thereon which is rotatably mounted. The roller is positioned in abutment with an individual carrier belt for rolling contact with that belt, i.e., as the belt moves along its path, it also causes the roller to rotate due to its abutment therewith. Due to its contact with the belt, the roller applies a force to the belt. The direction of that force being applied to the belt can be selectively controlled by varying the orientation of the roller vis-a-vis the carrier belt.

Each roller is adjustably mounted on the frame assembly of the filter such that the axis of rotation of the roller may be varied. This adjustability provides the user with the capability of modifying the direction of the force being applied to the belt by the respective roller. The orientation of the roller may be varied not only in a horizontal plane but furthermore, the orientation of the roller in the vertical plane may also be varied.

In one embodiment, the roller is rotatably mounted to an elongate shaft which extends between slotted mountings within the frame. The slotted mountings permit a displacement of the shaft within a horizontal plane, and more specifically an angular rotation of the shaft about a vertical axis. After being positioned in a desired location, the shaft may be releasably retained in that position to impart a selectively directed force on the carrier belt.

DETAILED DESCRIPTION OF THE DRAWINGS

Figure 3:
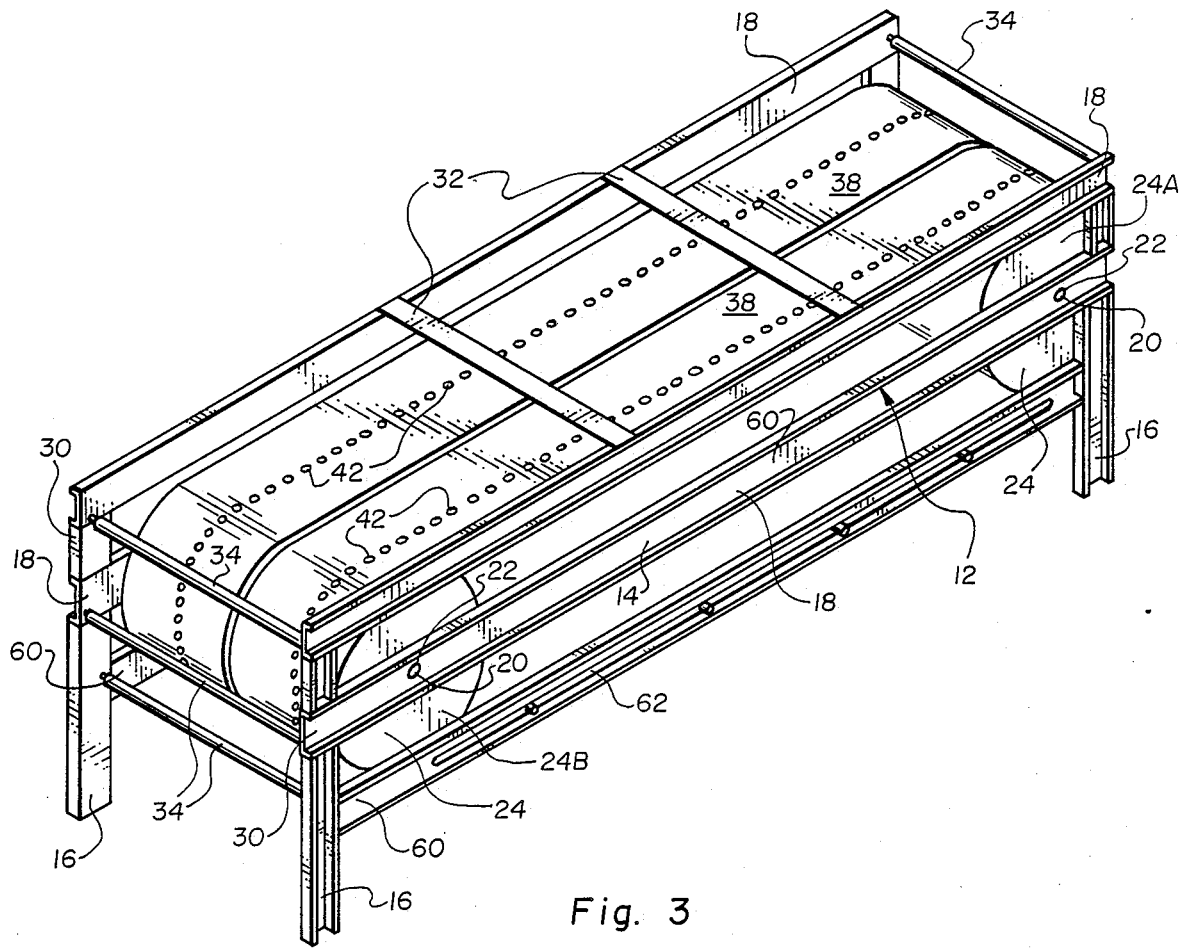
FIG. 3 is an elevated perspective view of a horizontal belt filter of the invention having the filter cloth medium removed for purposes of clarity.

FIG. 3 illustrates a horizontal belt filter generally 12 having an elongate frame 14. The frame 14 includes a plurality of upright leg members 16 and a plurality of side members 18 which are mounted to the leg members 16 to extend therebetween. A first side member 18 defines openings 20 therein adapted to receive and retain the axial shaft 22 of a cylindrical drum 24. Two drums respectfully 24A and 24B are rotatably mounted on shaft 22 on opposite ends of the frame 14. One of the drums 24A is rotatably driven by a motor 26 which is shown schematically in FIG. 4. The second drum 24B is designated as a take-up drum.

Figure 6:
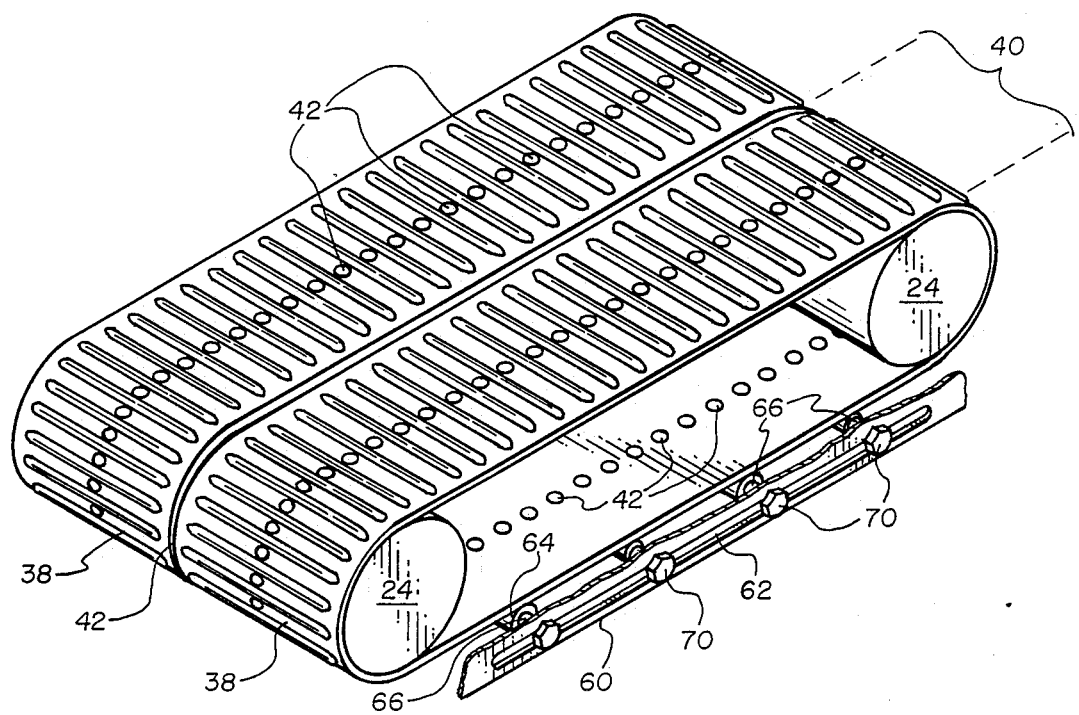
FIG. 6 is an elevational perspective view of a multiple carrier belt arrangement in association with a slotted support roller assembly.
Figure 7:
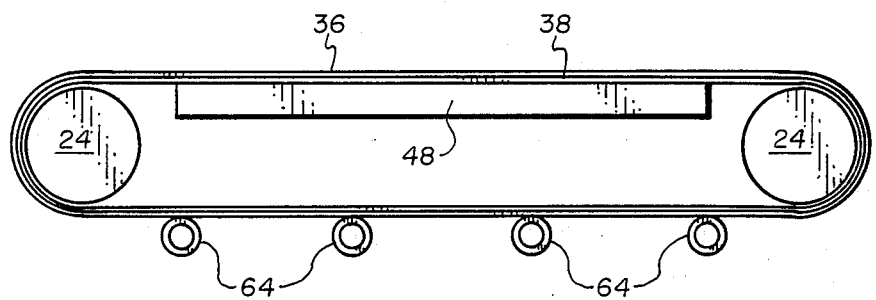
FIG. 7 is a side view of the belt arrangement of FIG. 6 illustrating the support roll placement and the vacuum pan.

Each side 30 of the frame assembly is linked to the other side by cross support members 32. A plurality of roller members 34 are mounted to the two sides of the frame assembly to extend therebetween. The rollers 34 are adapted to guide a cloth or other filter medium 36 in a preselected path through the filter. As shown to advantage in FIG. 4, the medium 36 follows an endless circuitous path. Referring to FIG. 6, each belt 38 is an annular shaped endless member having a width 40. The belts 38 define a plurality of apertures 42 therein which are arranged, generally linearly, along the length of the belt. The openings pass through the entire thickness of the belt 38.

Figure 8:
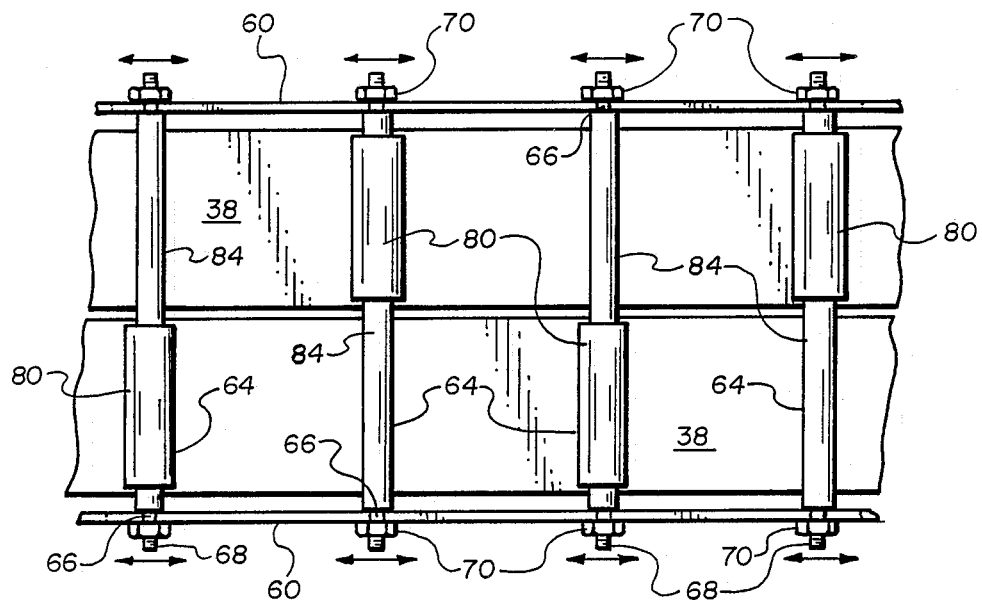
FIG. 8 is a bottom view of a plurality of support rollers in association with a pair of carrier belts.
Figure 9:
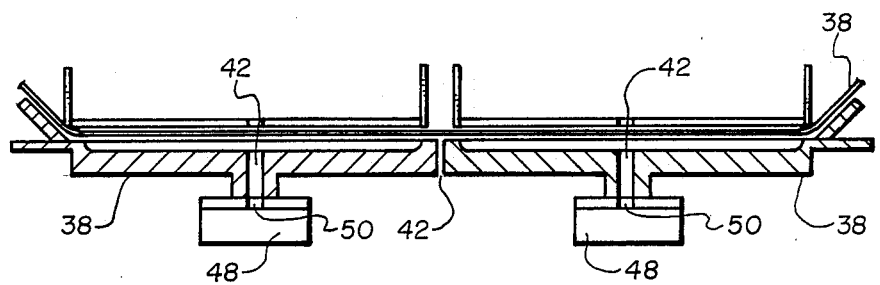
FIG. 9 is a cross-sectional view of a pair of carrier belts in association with a filter cloth medium and a pair of vacuum pans.

The belts are trained about the drums 24A and 24B to extend therebetween. As shown in FIGS. 3, 8 and 9, the belts are positioned contiguous to one another. It is desired to maintain the gap 43 between the belts to a minimum. Preferably, the belts are held in abutment one against another such that there is no gap 43, i.e. zero gap between each pair of adjacent belts. In operation, the filter cloth 36, which is positioned over and atop the belt 38 during the working run of filter, tends to be urged into the gap by slurry residing above the medium. As the belts are displaced along their paths, any portion of the medium cloth 36 which becomes lodged in the gap 43 tends to be pinched by the belts. This pinching hastens the deterioration of the medium and hence is undesirable. Therefore, the belts are preferably maintained as close to one another as possible without having one belt riding atop another at their outer edges.

Figure 4:
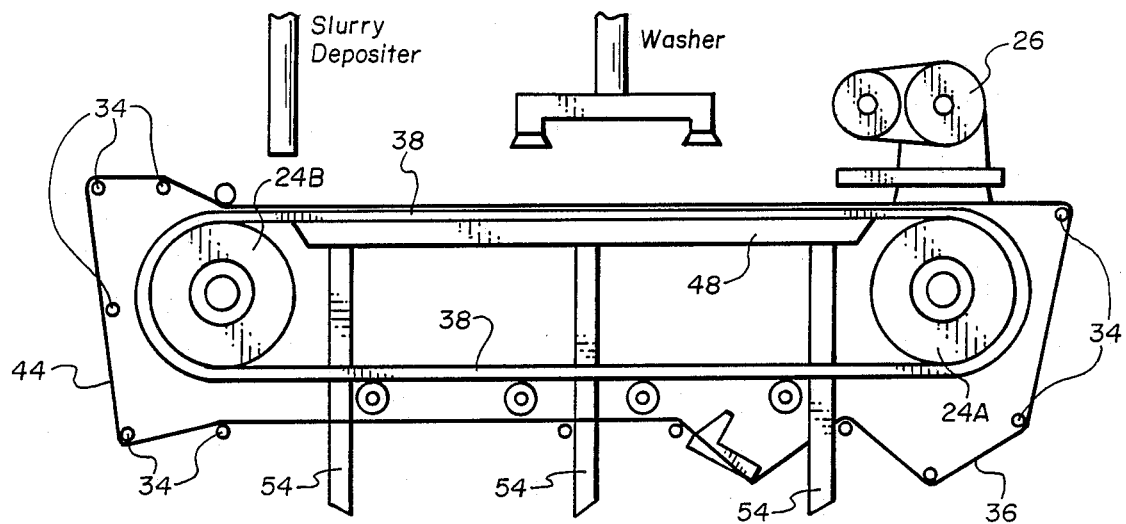
FIG. 4 is schematic side view of a horizontal belt filter.

Referring to FIG. 4 fitted beneath each carrier belt 38 is an elongate vacuum pan 48 suited for applying a suction pressure to the underside of its respective belt 38 through means of an elongate slot-like aperture 50 defined within the upper surface of the pan.

As depicted in FIG. 9, the openings 42 in belt 38 and the slot 50 are held in registration such that the pressure differential created in vacuum pan 48 communicates through the slot 50 and openings 42 to the porous filter medium 36. Due to the pressure differential and also gravity, liquid in a slurry residing atop the filter medium 36 is induced to flow through the porous filter medium onto belt 38. The liquid is then drawn through openings 42 and into slots 50. Once the liquid is received into the vacuum pan 48, it is drained from that pan by discharge conduits 54.

As shown in FIG. 6, the side braces 60 are positioned parallel each other on opposing sides of the filter frame assembly. Each side brace member 60 defines an elongate slot 62 therein. Mounted within these slots 62 and extending between the opposing side brace members 60 is a plurality of support rollers 64.

Figure 10:
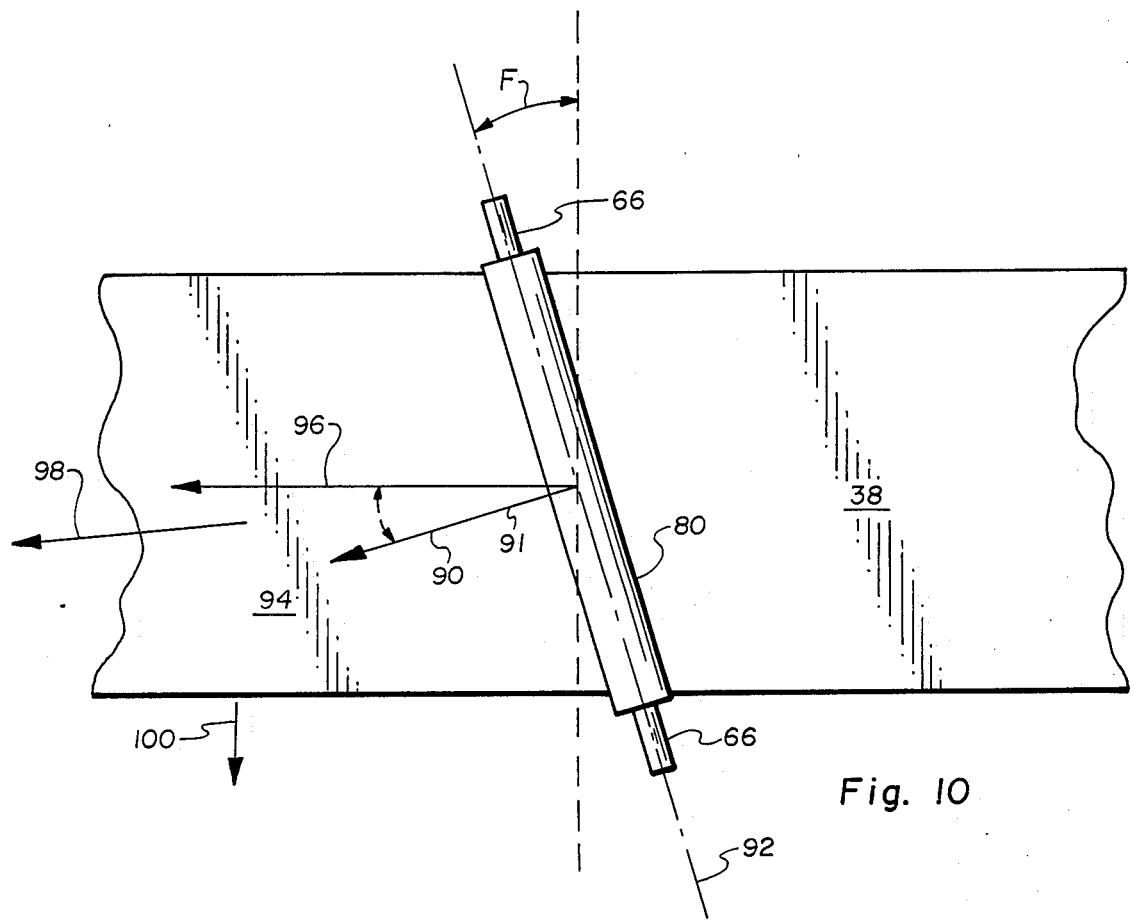
FIG. 10 is a bottom sectional view of a carrier belt in association with an angulated support roller.

Each support roller 64 includes an axle 66 which extends the full length of the roller 64. The axle 66 includes male threaded ends 68 which are configured to mechanically cooperate with retaining means 70. As shown, these retaining means 70 may be a nut having female threads. The axle 66 is retainable within a number of positions and orientations within its slot 62 mounting. Not only is the axle 66 positionable to be perpendicular to the side brace members 60 as shown in FIG. 10, the axle may also be positioned at angle (F) to those side braces. The user can adjust the position and orientation of the axle 66 by loosening the nut retaining means 70 and sliding the axle 66 in slots 62 to a desired location and orientation. Tightening the two nut restraining means 70 against the opposing side brace members 60 causes the axle to be held firmly in place due to the action of the restraining means against the side braces.

Figure 16:
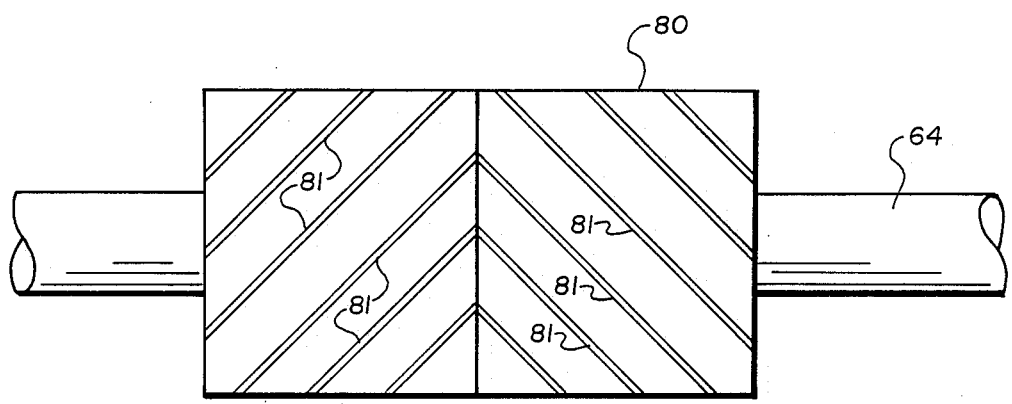
FIG. 16 is a front view of a modified support roller having a chevron configured roller surface.

Mounted on each axle 66 is a hollow shaft 74 as shown in FIG. 8. The axle 66 is mounted within a channel defined within the shaft 74 and is mechanically associated with the shaft 74 by roller bearings positioned on the axle 66 proximate the mounting of the axle 66 within the slots 62. The shaft 74 is composed of two cylindrically shaped segments. The first segment 80 is dimensioned to have a diameter sufficient that the first segment 80 abuts against a single, individual carrier belt 38A. As shown, the first segment 80 may have a right cylindrical appearance wherein the sidewalls of that cylinder are smooth. The sidewalls may, in alternative embodiments, be textured, serrated, or configured otherwise to present a high friction surface. An example of an alternative sidewall surface for segment 80 is illustrated in FIG. 16. As shown, the cylindrical sidewall surface of segment 80 may be configured to include a plurality of upstanding ribs 81 oriented in a chevron-like arrangement. These types of configurations are specifically addressed to overcome traction problems between the belt and the roller which may be created by liquid or debris becoming positioned within the interface of the belt with the support roller. The modified support roller surfaces, such as the chevron-type illustrated, function to encourage an abutment between the belt and roller and thereby ensure a rolling contact between the belt and roller. The first segment 80 may be manufactured of rubber, stainless steel or steel.

Figure 11:
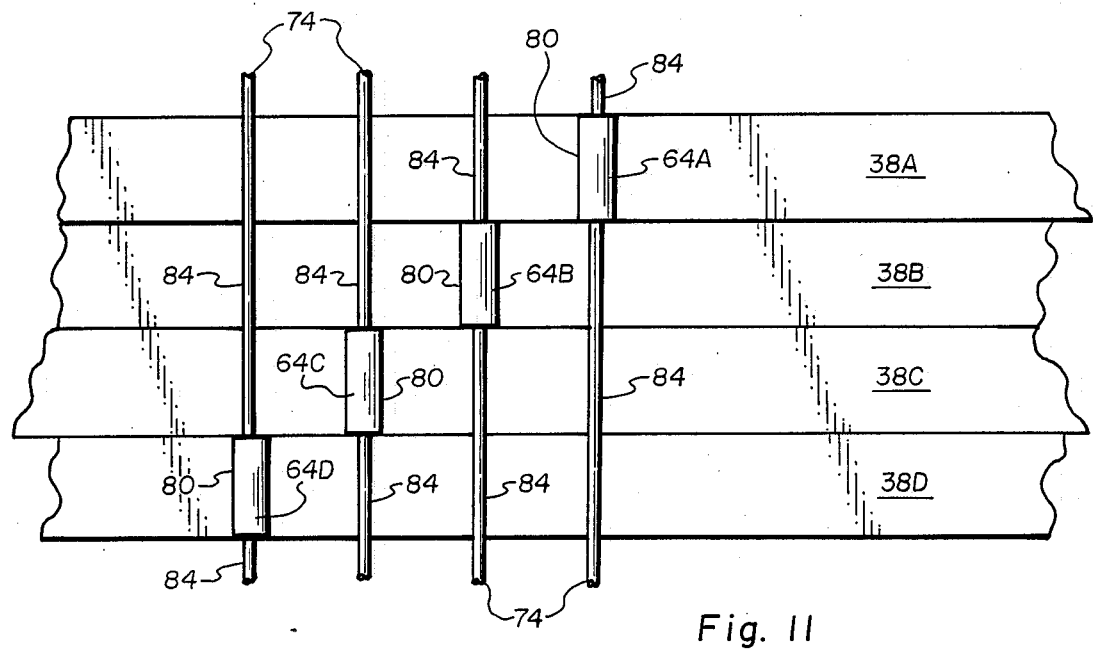
FIG. 11 is a bottom sectional view of a plurality of carrier belts in association with an array of support rollers.

The second segment 84 of the shaft 80 may also present a generally right cylindrical appearance. As shown to advantage in FIG. 11, the second segment may be in one or two parts. For example, for support rollers 64A and 64D wherein the carrier belts 38A and 38D are the outermost positioned belts in the carrier belt assembly, the first segment 80 is mounted on one of its ends to a unitary second segment 84. In contrast, those support rollers whose first segments 80 contact carrier belts 38 which are not positioned on the outer boundary of the carrier belt assembly, e.g., support rollers 64B and 64C, are composed of a first segment 84 having a two part second segment. One second segment is mounted on each of the opposing ends of the first segment.

Figure 13:
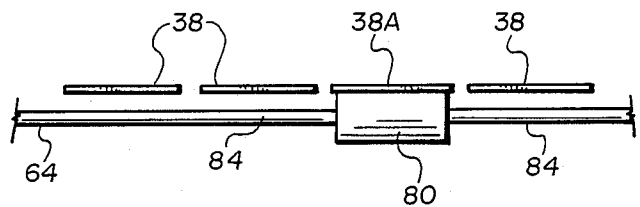
FIG. 13 is a cross-sectional view of a plurality of carrier belts in association with a single support roller, the other rollers having been omitted for clarity.

As is shown in FIG. 13, the diameter of the second segment 84 is dimensioned such that that segment 84 is held out of contact with any of the carrier belts 38. The arrangement of the segmented rollers is adjusted so that notwithstanding any slackening or other downward displacement of the carrier belts 38, the second segments 84 should never be brought into contact, rolling or otherwise, with a carrier belt 38. Resultingly, each support roller contacts one and only one carrier belt, that contact being that of a roller segment 80 with the carrier belt 38.

Figure 5:
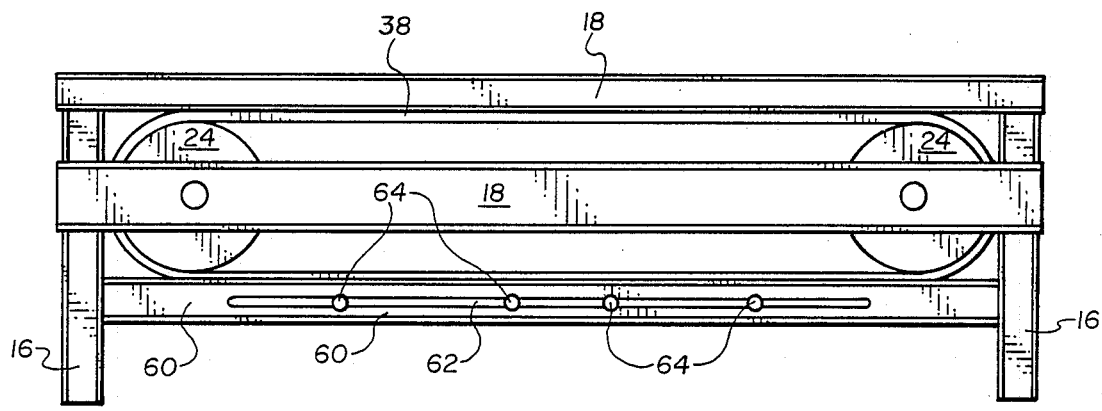
FIG. 5 is a side view of the belt filter shown in FIG. 3.
Figure 14:
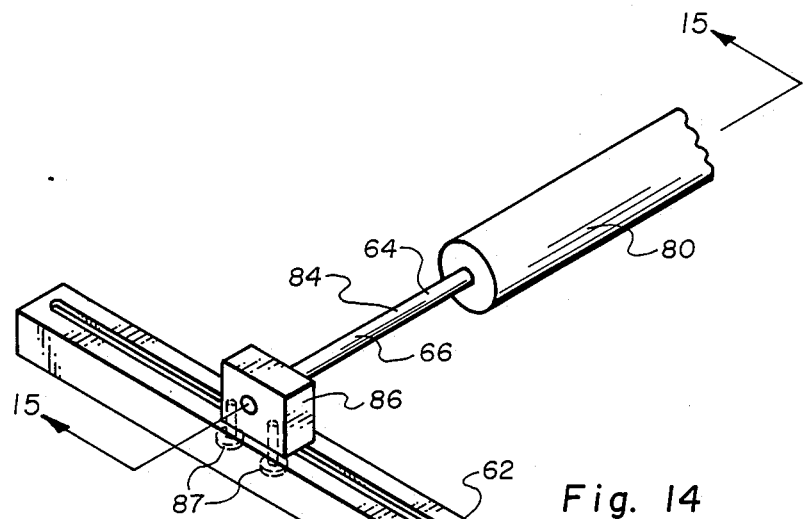
FIG. 14 is a perspective sectional view of an alternative support rod mounting.
Figure 15:
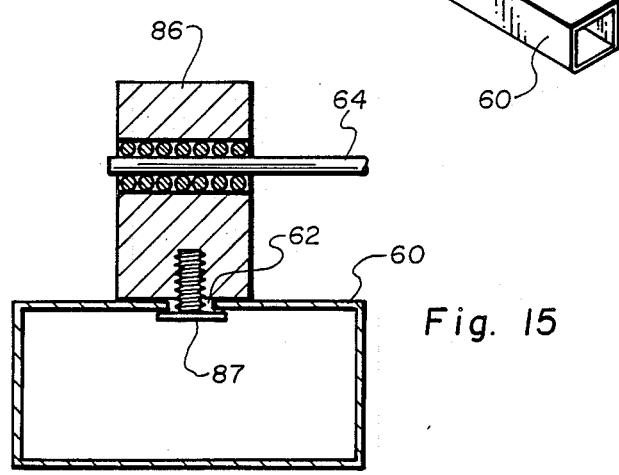
FIG. 15 is a cross-sectional view of the support rod mounting shown in FIG. 14 taken along sectional lines 15—15.

FIG. 14 illustrates a second embodiment of the support roller 64 and its mounting on the filter frame assembly. In this embodiment, the support roller 64 may be configured as a single integral unit, i.e. the axle 66, the first segment 80 and the second segment 84 are formed in one-piece, solid construction. Each end of a support roller 64 is journaled within a roller bearing fitted pillow block 86. Each block 86 is adjustably mounted to a slot defining frame assembly side brace 60. As opposed to the first described embodiment, in the second embodiment the slot 62 extends in a horizontal plane, in contrast to the slot 62 shown in FIGS. 5 and 6 which is defined in a vertical plane.

Bolts 87 pass through the slot 62 and are threadedly cooperated with the block 86. The action of the bolts, i.e. the head of the bolt against brace 60 and the threaded engagement of the bolt threads, with the block 86 forms a manually releasable union of the block 86 with the side brace 60. The location of the block 86 along the brace 60 may be adjusted by loosening the bolts 87 and sliding the block along the brace 60 to a new location and then retightening the bolts 87. Recognizably, the user can adjust the orientation of the support roller 64 vis-a-vis the carrier belt 38 by shifting the blocks 86 to a proper orientation to yield he desired support roller orientation.

Figure 12:
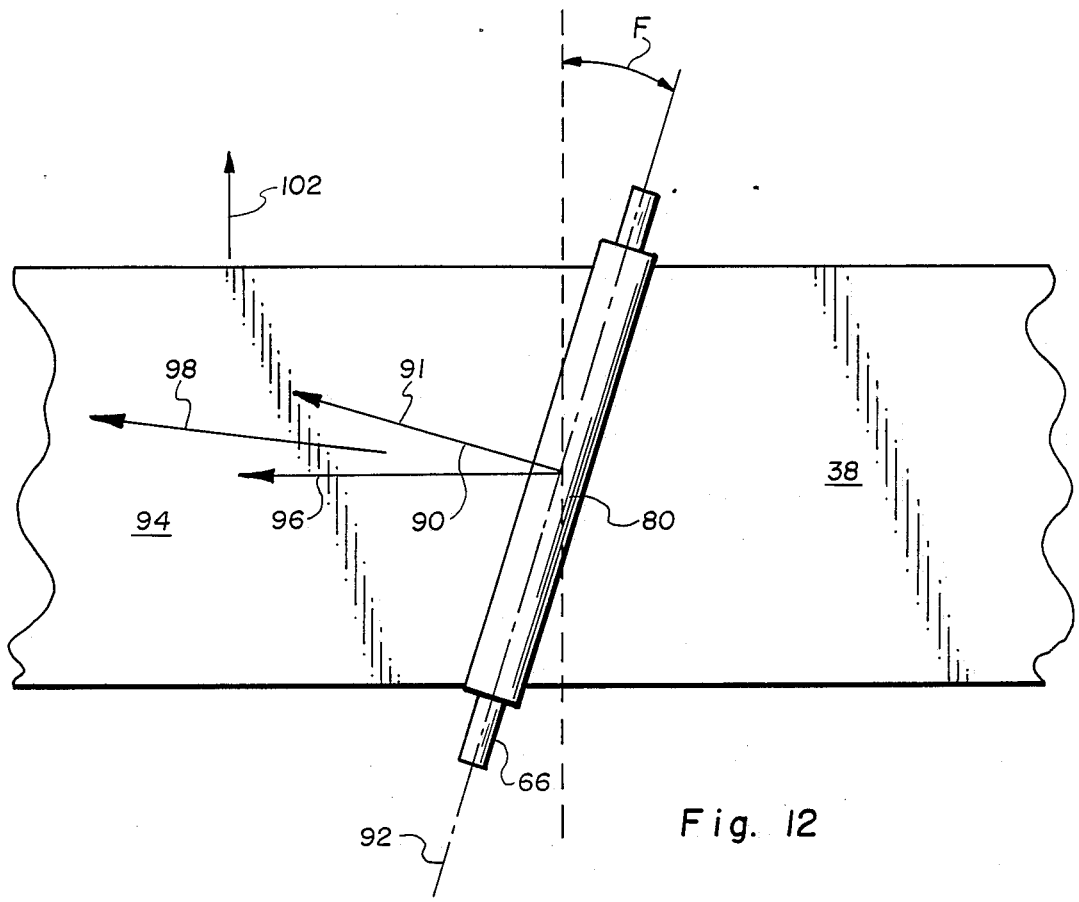
FIG. 12 is a bottom sectional view of a carrier belt in association with an angulated support roller similar to FIG. 10 but having the roller in a different orientation.

The rolling contact between a carrier belt 38 and its respective first segment 80 causes force to be imparted to the carrier belt 38. The force is applied to the surface 94 of the belt 38 at the interface of the belt 38 with the first roller segment. By adjusting the orientation of the axis of rotation (which axis is collinear with the longitudinal axis of the axle 66), the user is able to adjust the direction of travel of the carrier belt 38. Arrow 96 indicates the direction of travel of the belt 38. By orienting the first segment as shown, the roller 64 would effect the belt's direction of travel. Resultingly, the belt's direction of travel would shift, downstream of the support roller, in the direction indicated by arrow 98 thereby effecting a lateral displacement of the belt path in the direction indicated by arrow 100. Understandably, to effect a lateral shift in the belt path in the direction indicated by arrow 102, the first roller segment would be oriented to a position shown in FIG. 12

Each of the carrier belts 38 in the multi-belt horizontal filter is associated with a respective roller support 64. As shown to advantage in FIG. 13, each support roller 64 physically contacts one and only one carrier belt 38. The association of one roller to each individual carrier belt provides the user with the capacity to adjust each belt individually. Since the support rollers extend across the complete width of the multi-belt assembly and are mounted to the frame, the invention provides a means of ensuring the integrity of the support rollers, by providing a secure mounting, i.e. the side bars of the frame on which to mount the support rollers.

It should be understood that the embodiment described is only one of many possible embodiments of the invention. It is recognized that a user may vary the number of support rollers used in any particular filter. For example, less than the total number of carrier belts may be fitted with adjustment support rollers, presuming that less than the total number of belts require adjustment. Alternatively, more than one adjustment support roller may be associated with any given carrier belt. Further, the placement of the support roller vis-a-vis the frame assembly of the filter may be varied. Whereas the described embodiment describes a placement of the support rollers proximate the return run of the carrier belt, preferably near the take-up drum, this placement is by no means required. The support rollers could equally be placed above the carrier belt on the return run of that belt or alternatively above or below the working run of that belt.

Figure 1:
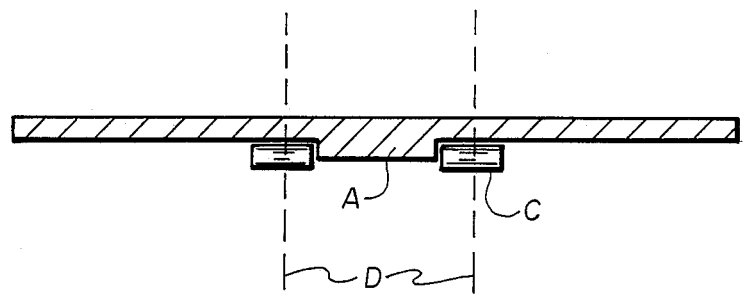
FIG. 1 is a cross-sectional view of a carrier belt and a first guide means of the prior art.
Figure 2:
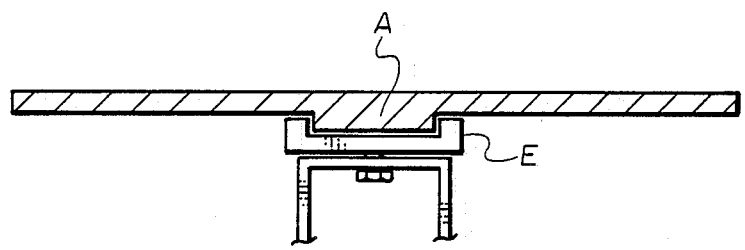
FIG. 2 is a cross-sectional view of a carrier belt and a second guide means of the prior art.

Recognizably, the instant adjustment guide means may be used in conjunction with other types of belt path adjustment means. For example, the invention may be used with edge guide means of the type disclosed in the Davis patent described hereinabove or alternatively in association with the guide means represented by those illustrated in FIGS. 1 and 2.

What is claimed is:

1. A horizontal filter comprising a frame having a pair of oppositely positioned sides, a pair of endless belts, said belts being trained about a common pair of drums mounted on opposite ends of said frame, said frame having a pair of oppositely positioned sides, said pair of belts being mounted between said frame sides, one of said drums being driven, said belts providing a working upper run and a lower return run, said belts being oriented continuously adjacent one another in a side-by-side relationship, a side of a first said belt abutting against a side of a second said belt along the entire length of said belt, a pair of shafts, each shaft being mounted on each of said frame sides and extending between said frame sides, each shaft having a roller rotatably mounted thereon, each roller being positioned contiguous a lower surface of a lower return run of a respective one of said belts and means for adjusting the orientation of the shafts such that each said roller is held in a rolling contact with said single respective said belt for applying a selectively directed force thereto to retain said respective belt in abutment against the other said belt.

2. The horizontal filter according to claim 1 wherein said shafts are positioned proximate a non-driven drum.

3. The horizontal filter according to claim 1 wherein said frame assembly includes a vacuum pan positioned below said upper working run of said pair of belts, said vacuum pan defining an aperture therein for use in applying a vacuum to said plurality of belts.

4. The horizontal filter according to claim 3 wherein each said belt defines a plurality of openings therein arranged to register with said vacuum aperture as said belt is driven over said drums.

5. The horizontal filter according to claim 1 wherein a vacuum pan having a vacuum aperture is mounted on said frame and positioned below said upper run of said endless belts, each said belt defining a plurality of openings therein arranged to register with said vacuum aperture as said belt is driven over said drums.

6. The horizontal filter according to claim 1 wherein the means for adjusting the position of the shafts comprises:
an elongate, cylindrical axle having opposing threaded ends dimensioned to be received through an elongate slot defined on each side of said frame and through each shaft, said axle extending across a width of said frame;
a pair of threaded nut members, each nut member being threadedly mounted on a respective axle end and abutting against the portion of said frame which defines said slots, said nut member retaining said axle in a preselected orientation within said slots, said nut members being manually adjustable to facilitate a modification of said axles' orientation within said slots; and
bearing means between said axle and said shaft;
wherein said roller is dimensioned to have a second diameter and a length to contact a single respective said belt while avoiding contact with any of the remaining said belts.

7. The horizontal filter according to claim 1 wherein said means for adjusting the orientation of each shaft comprises:
an elongate, cylindrical axle having opposing threaded ends dimensioned to be received through an elongate slot defined on each side of said frame and through each shaft, said axle extending across a width of said frame;
a pair of threaded nut members, each nut member being threadedly mounted on a respective axle end and abutting against the portion of said frame which defines said slots, said nut member retaining said axle in a preselected orientation within said slots, said nut members being manually adjustable to facilitate a modification of said axles' orientation within said slots; and
wherein said roller is dimensioned to have a second diameter and a length to contact a single respective said belt while avoiding contact with any of the remaining said belts.

8. A horizontal filter comprising:

a pair of endless belts trained about a pair of drums mounted on a frame, at least one of said drums being driven, said belts providing an upper working run and a lower return run;

a first guide support mounted on said frame, said guide having a first roller engaging a first belt on a lower surface of its lower return run, said first roller being rotatable about a first horizontal axis, said first horizontal axis being oriented transverse to a direction of travel of said first belt, means for adjusting the orientation of said first roller on said frame such that said first horizontal axis is angularly displaceable about a first vertical axis and within a horizontal plane to impart a preselectively directioned force to said first belt to adjust a tracking of said first belt on said drums; and a second guide support mounted on said frame, said guide support having a second roller engaging a second belt, said second roller being rotatable about a second horizontal axis, said second horizontal axis being oriented transverse to a direction of travel of said second belt, means for adjusting the orientation of said second roller on said frame such that said second horizontal axis is angularly displaceable about a second vertical axis and within a horizontal plane to impart a preselectively directioned force to said second belt to adjust a tracking of said second belt on said drums.

9. A horizontal filter comprising:

a pair of endless belts trained about a common pair of drums mounted on opposite ends of a frame, said frame having a pair of oppositely positioned sides, said pair of belts being mounted between said sides, said belts providing a working upper run and a lower return run;

a plurality of guide shafts, each guide shaft being mounted on each of said frame sides extending between said sides, each shaft being rotatable about a substantially horizontal axis, means for adjusting the orientation of the shafts on said frame sides wherein a user may modify said axis location within a horizontal plane, said shaft being dimensioned and oriented to avoid contact with any of said belts; and a plurality of rollers, one roller being mounted on each of said guide shafts, each said roller extending outward from its guide shaft to frictionally engage a single respective belt on a lower surface of its lower return run wherein each said roller applies a force to its said respective belt upon said belt being driven by said drum, a desired direction of said force being obtained by an appropriate modification of said axis location.

10. The horizontal filter according to claim 9 wherein said shafts are positioned proximate a non-driven drum.

11. The horizontal filter according to claim 9 wherein said frame includes a vacuum pan positioned below said upper working run of said pair of belts, said vacuum pan defining an aperture therein for use in applying a vacuum to said pair of belts.

12. A horizontal filter comprising:

a pair of endless belts trained about a common pair of drums mounted on opposite ends of a frame, one of said drums being driven, said belts providing a working upper run and a lower return run;

a plurality of guides mounted in slots defined within said frame to be locationally and orientationally adjustable on said frame, each said guide extending across a width of said pair of endless belts, each said guide including an elongated cylindrical roller extending from said guide and frictionally engaging a single said belt on a lower surface of its lower return run, said roller being rotatable about an axis, each said guide being adjustably mounted on said frame to permit selective positioning of its said axis, said guide applying a selectively directed force to its respective belt to adjust an orientation of said belt on said drums.

13. The horizontal filter according to claim 12 wherein each said guide comprises an elongate support shaft having a first diameter and said elongate cylindrical roller is mounted on said shaft, having a second diameter, said first diameter being dimensioned sufficiently smaller than said second diameter such that said roller contacts its respective said belt and said shaft avoids contact with any of said belts.

* * * * *